US007684349B2

(12) United States Patent  (10) Patent No.: US 7,684,349 B2
Oral et al.  (45) Date of Patent: Mar. 23, 2010

(54) METHOD AND SYSTEM FOR TRANSPARENTLY CONTROLLING THE BEHAVIOR OF SERVICE METHODS IN A SERVICE ORIENTED ARCHITECTURE

(75) Inventors: Tolga Oral, Arlington, MA (US); Sami M. Shalabi, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 1274 days.

(21) Appl. No.: 11/189,972

(22) Filed: Jul. 26, 2005

(65) Prior Publication Data

US 2007/0038979 A1 Feb. 15, 2007

(51) Int. Cl.
*H04L 12/28* (2006.01)
(52) U.S. Cl. ..................................... 370/254; 370/400
(58) Field of Classification Search ................. 370/254, 370/255, 400, 401
See application file for complete search history.

(56) References Cited

U.S. PATENT DOCUMENTS

| | | | |
|---|---|---|---|
| 6,282,568 B1* | 8/2001 | Sondur et al. ............... 709/223 |
| 6,407,680 B1* | 6/2002 | Lai et al. ..................... 341/50 |
| 6,888,477 B2* | 5/2005 | Lai et al. ..................... 341/50 |
| 7,460,491 B2* | 12/2008 | Singh et al. .................. 370/254 |
| 2004/0117803 A1 | 6/2004 | Srivastava et al. |
| 2004/0162741 A1 | 8/2004 | Flaxer et al. |
| 2004/0177335 A1 | 9/2004 | Beisiegel et al. |
| 2005/0265317 A1* | 12/2005 | Reeves et al. ............... 370/352 |

* cited by examiner

*Primary Examiner*—Hong Cho
(74) *Attorney, Agent, or Firm*—David A. Dagg

(57) ABSTRACT

A method and system for transparently controlling infrastructure service methods in a service oriented architecture by enabling a higher level application component that is a consumer of infrastructure services to be alerted both before and after an infrastructure service is executed, by either that component or from an external source, such as another higher level application component. The pre-execution event enables a higher level application component to run additional business logic, change arguments passed to the infrastructure service before the call to the infrastructure service, or completely cancel execution of the infrastructure service method and route execution flow to other business logic. Since higher level application components can also be alerted after infrastructure service execution, they can also introduce additional business logic at that point, and/or change the return value passed from the service call. The system advantageously provides transparent control over behavior of infrastructure services without requiring large amounts of code to be added to providers and consumers of such services.

26 Claims, 3 Drawing Sheets

METHOD AND SYSTEM FOR TRANSPARENTLY CONTROLLING THE BEHAVIOR OF SERVICE METHODS IN A SERVICE ORIENTED ARCHITECTURE

FIELD OF THE INVENTION

The present invention relates generally to providing software services, and more specifically to a method and system for transparently controlling the behavior of service methods in a service oriented software architecture.

BACKGROUND OF THE INVENTION

Various service oriented software platforms have been developed for building distributed enterprise applications. One example of such a system is the Java 2 Platform, Enterprise Edition ("J2EE") from Sun Microsystems, Inc. In existing service oriented software platforms, infrastructure services are typically very generic, in order to serve a lowest common denominator of requirements for all higher level application components. However, though these generic infrastructure services fit the requirements of most higher level application components, some application components may have requirements that are not met. To address this problem, higher level application components may be forced to re-implement infrastructure services to meet their specific needs, or find other ways to make behavioral changes to the generic services provided.

For example, in previous systems, such as IBM® Lotus Workplace™, higher level application components have themselves run specific business logic before calling infrastructure services, or internally re-implemented services to meet their specific needs. This approach requires significant coding by the application component developer, and limit code reuse. When higher level, component-specific service-related business logic is included within higher level components, overall system maintenance may be difficult.

Other previous systems have included an event broker to dispatch method calls and provide higher level application components with software "hooks" into other higher level application components. An example of such an approach is the Common Event Infrastructure (CEI) technology provided by International Business Machines Corporation. However, these technologies do not help higher level application components fully control the flow of service methods, do not allow changing arguments or return values of the infrastructure service methods, and/or changing or canceling execution flow in connection with the use of such infrastructure service methods. As a result, significant coding within higher level components using the services may be necessary to provide individualized support. Existing publication/subscription based systems may be considered another example of event brokerage, and typically suffer from the same inherent problems.

The "Mediator Pattern" is a well known behavioral pattern involving an object that encapsulates how a set of objects interact. This approach promotes loose coupling of software objects by keeping objects from referring to each other explicitly, and allows some independent control of object interaction. While the Mediator Pattern approach allows for some argument transformation, both client and server software must follow the pattern to enable the transformation, and complete control over infrastructure service methods is not provided.

Internet Server Application Programming Interface (ISAPI) filters have been used to route or provide early termination of requests coming to a Web server. While some limited execution control is provided, ISAPI filters are a specific solution to Web server requests, and do not provide complete control over service methods.

As described above, previous solutions have had significant shortcomings, in that they required significant additional coding for a higher level consumer component and/or the provider of a service. Previous solutions have also failed to provide full control over services to higher level application components that use those services. For these reasons and others, it would be desirable to have a new approach to providing a service oriented architecture, which allows higher level application components using the infrastructure services to have more complete control over those infrastructure services.

SUMMARY OF THE INVENTION

To address the above described and other shortcomings of the prior art, a method and system are disclosed for transparently controlling infrastructure service methods in a service oriented architecture. The disclosed system not only enables pre and post events, but also allows execution flow changes, and argument and return value transformations, while requiring minimal code changes in the service consumer and client application components.

The disclosed system enables a higher level application component to be alerted when an infrastructure service is requested, whether the infrastructure service is requested by that higher level application component, or by a source that is external to that higher level application component, such as another higher level application component. The pre-execution event enables a higher level application component to run additional business logic, change arguments passed to the infrastructure service before the call to the infrastructure service, cancel execution of the infrastructure service method, and/or route execution flow to other business logic to be executed in lieu of the requested infrastructure service. Higher level application components can also be alerted after infrastructure service execution, so that they can advantageously introduce additional business logic at that point to change the returned value or values passed from the service call. The disclosed system in this way provides transparent control over the behavior of infrastructure services without requiring large amounts of code to be added to providers and consumers of such services.

In one embodiment, the disclosed system provides an interface to a higher level application component that enables the higher level application component to associate one or more listener objects with an infrastructure service method. The listener objects can be defined by the higher level application component to execute program code indicated by the higher level application component either before execution of the associated infrastructure service method, and/or after execution of the associated infrastructure service method, prior to the infrastructure service method returning its completion values. The program code executed by listener objects advantageously provides complete control over the associated infrastructure service method, for example by passing different and/or modified parameters to the associated infrastructure service method, preventing execution of the service method before the service method is called, allowing the service method to execute and then changing the return value (s) of the service call, and/or causing alternative program code to execute in lieu of the service method.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
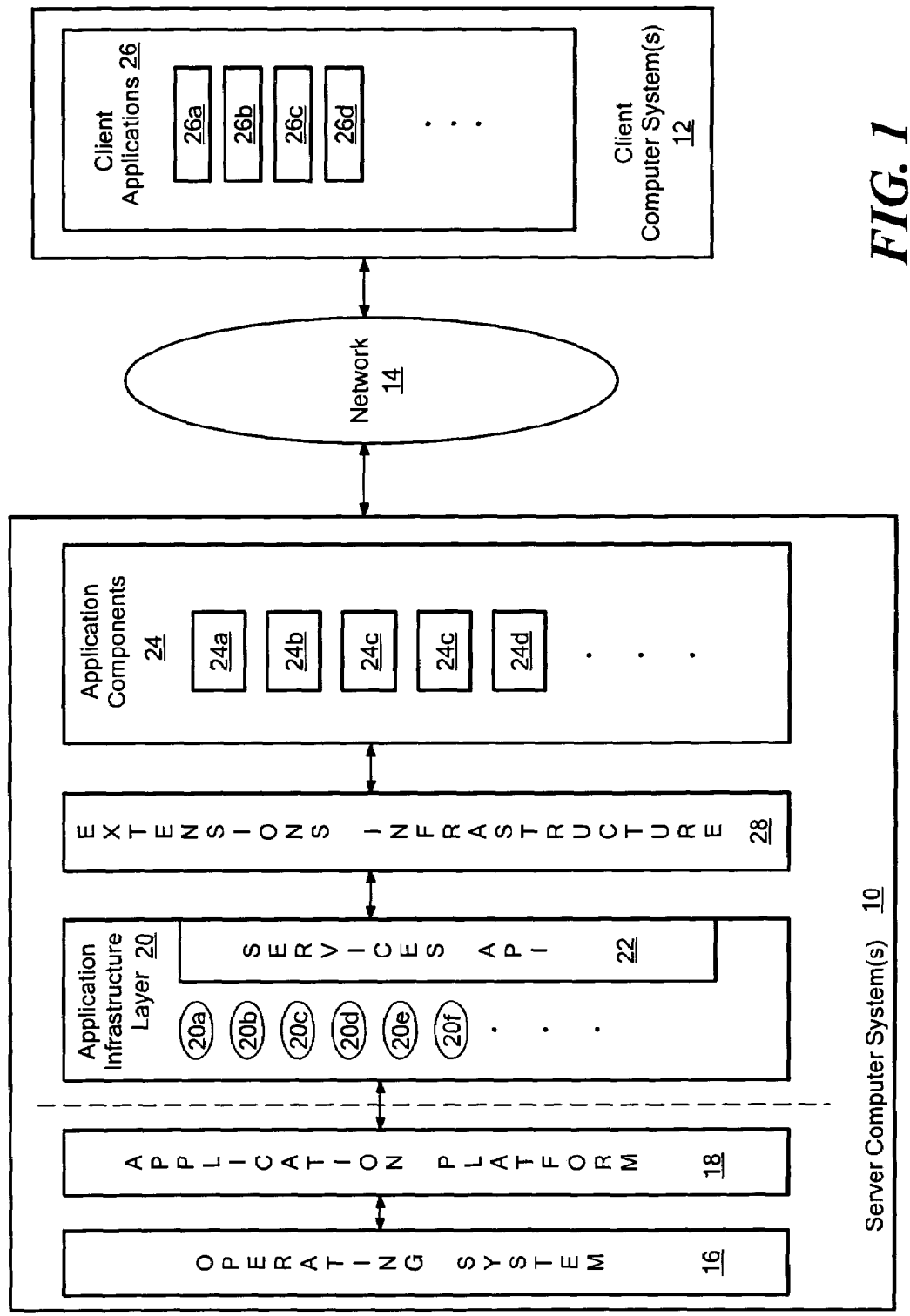
FIG. 1 is a block diagram showing computer systems and software components in an illustrative embodiment.

As shown in FIG. 1, in an embodiment of the disclosed system, a number of software components execute on various computer systems, shown for purposes of illustration in FIG. 1 including one or more server computer system(s) 10 and one or more client computer system(s) 12. The server computer system 10 and client computer system 12 may, for example, each include at least one processor and program storage, such as memory, for storing program code executable on the processor, and one or more input/output devices and/or interfaces, such as data communication and/or peripheral devices and/or interfaces. The computer systems 10 and 12 are communicably connected by a data communication network 14, such as a Local Area Network (LAN), the Internet, or the like, which may also be connected to a number of other client and/or server computer systems. The computer systems 10 and 12 may further include any appropriate type of operating system software. The software components shown in the server computer system(s) 10 may be broken down into multiple tiers and separated into different server computer systems as may be appropriate for a given embodiment.

As shown in FIG. 1, the server computer system includes an operating system 16, and optional application platform software 18. On top of the operating system 16 and/or application platform software 18 is an infrastructure software layer 20. The infrastructure layer 20 is shown including a number of infrastructure components 20a, 20b, 20c, 20d, 20e, 20f, etc. Such infrastructure components may include any specific kind of software component that provides a generic service that can be used by one or more of the higher layer application components 24. For example, the infrastructure components may include components providing services such as electronic mail services, search services, application sharing services, document library services, people finder services, membership and community services, application policy services, templating services, and/or any other specific type of infrastructure component. The infrastructure layer 20 further provides the higher level application components 24 with access to resources managed by or contained within the optional application platform 18 and/or the operating system 16.

The services of the infrastructure components are provided through a services application programming interface (API) 22. In one embodiment, the infrastructure layer 20 software components of FIG. 1 provide a service oriented software platform for building distributed enterprise applications, such as a service oriented software platform compatible with the Java 2 Platform, Enterprise Edition ("J2EE") platform, or the like. Alternatively, or in addition, any other specific type or architecture of a service oriented software platform may be used in the infrastructure layer 20.

An extensions infrastructure 28 is located between the infrastructure layer 20 and the higher layer application components 24. The application components layer 24 includes application components that are used by client applications 26. The application components layer 24 is shown for purposes of illustration including application components 24a, 24b, 24c, 24d, etc. Each of the application components in the application components layer 24 may, for example, consist of components of any specific type, and, for example, each having user interface functionality that is provided as at least part of a graphical user interface available through the client applications 25 on the client computer system 12 to a user of the client computer system 12. Examples of possible application components in the application components layer 24 include web conferencing, learning, forms, team calendar, discussion forum, and/or any other specific type of higher level application component that is a consumer of infrastructure layer 20 services.

For example, a web conferencing application component may use infrastructure services as follows: electronic mail services to send notifications to web conference attendees, application sharing services to share desktop applications, document library services to store web conference agenda materials, application policy services to determine if a certain user group can access all required web conferencing services, people finder services to find an invitee email address for a user interface it provides, and membership services to aggregate membership information to all required components.

The client applications 26, shown for purposes of illustration including client applications 26a, 26b, 26c, 26d, etc., may include any specific type of client application program, including but not limited to a Web browser, groupware application client, rich client application, mobile device client application, and/or any other application that can access the World Wide Web (Web). The client applications 26 may, for example, include applications in which all or part of the client application, including but not limited to a portion of a user interface within a graphical user interface, is downloaded from the server computer system(s) 10 each time it is run. In one example embodiment, the client applications 26 include a web browser client application presenting a Web portal page user interface, in which are represented a variety of services through corresponding portlets, where the portlets each consist of a small window on the portal page, and each portlet provides a corresponding one of the higher level application components 24.

During operation of the components shown in FIG. 1, and as further described below, application components 24 are consumers of services provided by the infrastructure layer 20 through the services API 22, in cooperation with operation of the extensions infrastructure 28. The application components 24 can accordingly request methods provided by the services application programming interface 22. The application components 24 are also provided with the ability to define listener objects that are executed by the extensions infrastructure 28 before and after methods provided by the services API 20 are executed. The listener objects defined in the extensions infrastructure 28 can change arguments passed to such service methods, prevent execution of such service methods, change completion values provided from such service methods, and/or provide alternative or additional program logic for execution before, after, or in lieu of execution of the service methods.

For example, in one embodiment, prevention of execution of a service method may be accomplished using a protocol between the extensions infrastructure 28 and the listener objects. Such an embodiment may provide that a listener object can return a value selected from a set of return values consisting of SUCCESS_CONTINUE, SUCCESS_CANCEL, ERROR_CONTINUE or ERROR_CANCEL, where SUCCESS_CONTINUE indicates that the listener object completed successfully and the service method may be executed, SUCCESS_CANCEL indicates that the listener object completed successfully and the service method should be canceled, ERROR_CONTINUE indicates that the listener object encountered and error but the service method may be executed, and ERROR_CANCEL indicates that the listener object encountered an error and the service method should be canceled. Accordingly, in such an embodiment, after execution of a listener object for a PRE_XXXX event occurring before execution of a service method XXXX, the extensions infrastructure 28 operates depending on the return value from the listener object to determine whether to call the service method XXXX. The disclosed system may further be embodied such that listener objects may be chained together, such that a set of listener objects may be invoked before and/or after a service method call. In this type of embodiment, the protocol between listener objects and the extensions infrastructure 28 may be extended to include return values indicating whether subsequent listener objects in the set are to be allowed to execute or are to be prevented from execution. Moreover, such an embodiment may provide for ordering and execution of listener objects within a chain or set based on a priority scheme, and the listener object return values in the protocol may further indicate the priorities of listener objects in the chain or set which may be subsequently executed. Such priorities of listener objects may, for example, consist of or correspond to access rights that may be predefined for or associated with each listener object.

Figure 2:
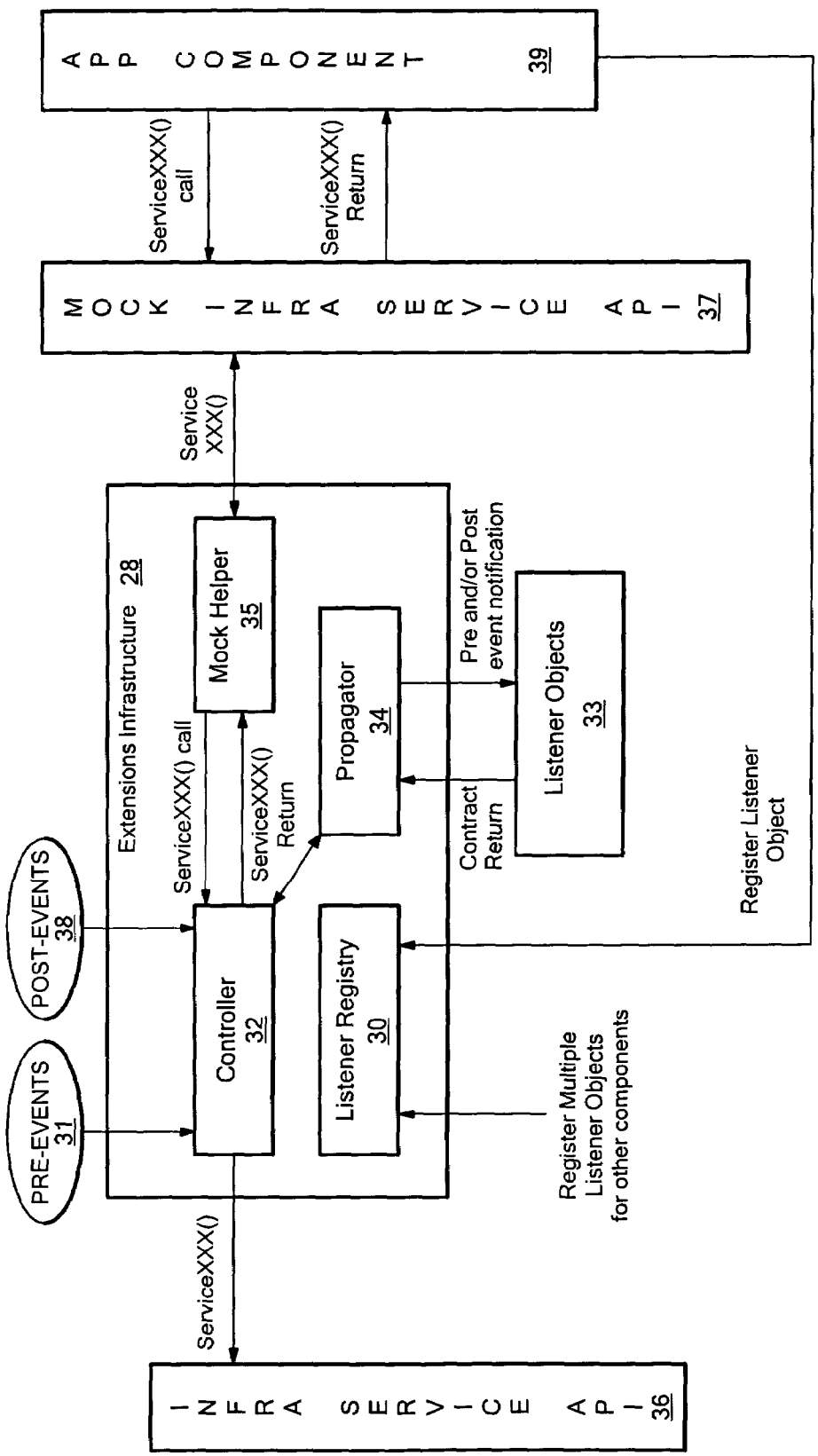
FIG. 2 is a block diagram showing further aspects of software components in an illustrative embodiment.

FIG. 2 shows an illustrative structure of the extensions infrastructure 28. The example of FIG. 2 includes a mock infrastructure service API 37 that receives calls and issues returns to infrastructure service calls from the application component 39, shown for purposes of illustration as serviceXXX( ) call and serviceXXX( ) return in FIG. 2. The mock infrastructure service API 37 uses mock helper software 35, which allows infrastructure service calls to be forwarded to the real infrastructure service API 36. Controller software 32 defines and applies rules of communication between listener objects 33 and infrastructure service methods. The propagator software 34 propagates events to the listener objects 33. The propagator 34 may be embodied to invoke the listener objects in synchronous or asynchronous, and/or prioritized or un-prioritized fashion. The application component 39 and/or other application components are allowed to register the listener objects 33 in the listener registry 30 for lookup operations by the controller 32. The listener objects 33 implement an interface defined by the extension infrastructure 28. The listener objects 33 may be these listeners may each be associated specifically with pre-execution event processing, post-execution event processing, or both pre-execution event processing and post-execution event processing. A contract defined by the controller 32 may be used to defines how the listener objects 33 return results back to the extensions infrastructure 28, and the extent of their power over execution control with respect to infrastructure services and/or other listener objects.

The listener registry 30 stores associations between methods provided by the infrastructure services and listener objects 33 that may be registered by the higher level application components. The listener registry 30 enables higher level application components to define such associations between listener objects 33 and infrastructure service methods. The listener registry 30 may include multiple listener objects for each infrastructure service method, with listener objects for a given service method registered by one or more higher level application components. In one embodiment, the listener registry 30 is made up of an eXtensible Mark-up Language (XML) file of key/value pairs, where the keys represent service methods, and the associated values are listener object Uniform Resource Identifiers (URIs), or another type of link or pointer. The listener registry 30 provides persistent storage of links between listener objects and associated service methods. While the listener registry 30 may be embodied through an XML file as described above, alternative embodiments may use other appropriate techniques, such as a properties file, RDBMS (Relational DataBase Management System), etc. The listener objects 33 may be any specific type of software components, such as, for example, Enterprise JavaBeans (EJBs), Plain Old Java Objects (POJOs), Web Services definitions, etc.

The propagator 34 may invoke listener objects 33 associated with service methods in the registry 30 through a remote or local call, using, for example, RMI (Remote Method Invocation), RMI-IIOP (Remote Method Invocation over Internet Inter-ORB Protocol), Web Services, or a regular Java call. Calls from the propagator 34 to listener objects 33 may or may not be ordered based on ordering or prioritization information stored in the registry 30. Additionally, calls from the controller 32 to listener objects 33 may be either synchronous or asynchronous with respect to other listener object calls and/or service method calls. When such calls are synchronous, the propagator 34 waits for each call to complete before making another call. Conversely, when such calls are asynchronous, the propagator 34 may make a subsequent call without waiting for a previous call to complete.

The propagator 34 calls listener objects 33 associated with service methods in response to events indicating that those service methods have themselves been requested by higher level application components, and also in response to events indicating that those service methods have completed. As noted above, the disclosed system may be embodied such that listener objects 33 associated with a service method are called to handle both pre-processing and post-processing of the associated service method. Alternatively, separate pre-processing and post-processing listener objects may be provided.

Calls to listener objects 33 by the propagator 34 provide the complete context necessary for listener object operation. In one embodiment, the context is represented by a contract that defines the context between the propagator 34 and the listener objects 33, as well as any interfaces that must be implemented by the listener objects 33. A complete context may, for example, include all arguments to be passed to or returned from the associated service method, an event definition including or representing the service method name, an indication of whether the call is being performed as pre-processing before the service method is called, or as post-processing after the service method has been called, and/or encoded status information resulting from previous program logic executed by the listener or another listener, as described above. The controller 32 may be embodied to invoke requested infrastructure service methods synchronously or asynchronously with regard to the associated listener objects. As shown in FIG. 2, the controller 32 may be embodied to respond to pre-event notifications 31 indicating service methods that have been requested, and post-event notifications 38 indicating service methods that have been completed or had their execution cancelled.

Figure 3:
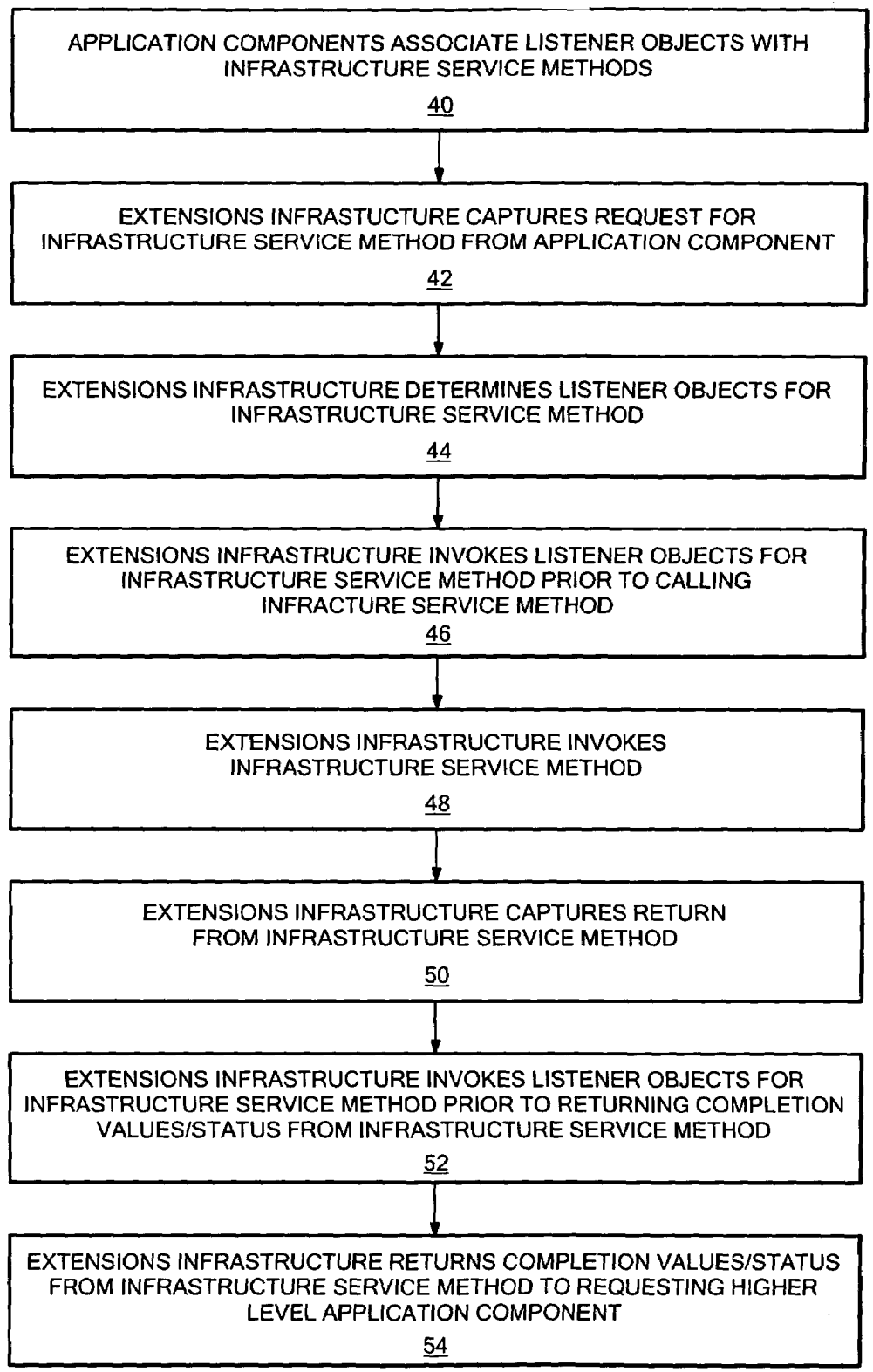
FIG. 3 is a flow chart showing steps performed in an illustrative embodiment.

FIG. 3 is a flow chart illustrating steps performed in an embodiment of the disclosed system. At step 40, higher level application components associate listener objects with infrastructure service methods, for example through an application programming interface to an extensions infrastructure such as the extensions infrastructure 28 of FIGS. 1 and 2. At step 42, the extensions infrastructure captures a request to an infrastructure service method, such as a request from one of the higher level application components. The request may be detected at step 42 by way of an event being passed to the extensions infrastructure, indicating a request has been made for an infrastructure service method. At step 44, the extensions infrastructure determines which, if any, listener objects have been associated with the service call detected at step 42, for example by reference to a listener registry. At step 46, the extensions infrastructure invokes all listener objects associated with the service method detected at step 42, prior to calling the service method. Business logic within such associated listener objects is then executed, potentially resulting in the arguments to the service method being changed, the service method not being executed, and/or any other specific kind of pre-processing. If the service method is not prevented from execution by the business logic executed at step 46, at step 48 the extensions infrastructure calls the service method, for example by way of the controller 32 shown in FIG. 2.

The extensions infrastructure captures the return from the service method at step 50, and invokes listener objects associated with that service method for post processing at step 52, prior to returning completion values and/or status from the infrastructure service method to the original requester of the service method in the higher level application components. After execution of the business logic defined for post-processing in the listener objects associated with the service method, at step 54 the extensions infrastructure returns completion values and/or status, which may have been modified by such post-processing business logic, to the original caller of the service method.

A use case example of operation in an embodiment of the disclosed system is now provided for purposes of explanation. In an embodiment of the disclosed system, infrastructure components are present providing a set of infrastructure services ranging from membership services such as addMember, removeMember, getMembers, etc., to life cycle services, such as create and remove. These infrastructure services have predetermined business logic that is generic enough to be used by multiple higher level application components. In this example, a higher level Web Conferences component uses the provided infrastructure services for life cycle and membership management. However, the Web Conferences component may have different requirements than are provided by some of the specific infrastructure services. For example, the Web conferences component may allow only one member of a conference to be assigned to a "moderator" role. However, the infrastructure service methods have no constraints on the number of members allowed for specific roles. Additionally, the Web Conferences higher level application component may require that an electronic mail ("email") invitation be sent to attendees after they are added as members, and that email notifications be sent after members are removed.

To solve this problem in an embodiment of the disclosed system, certain capabilities may be provided. In the following description, the term "event" is used synonymously to refer to an infrastructure service method call. For example, the addMember method call is associated with a PRE_ADDMEMBER event that fires before the service execution, and a POST_ADDMEMBER event that fires after.

A pre-event notification or "hook" is passed to a listener object indicated by the Web Conferences application component, together with all the context information necessary for complete execution of the listener object. Such a context includes all the arguments for the associated service method. The listener object, which may in fact be the Web Conferences application component, is allowed to alter the execution flow by executing additional program logic, changing the pre-execution method arguments, halting execution of the associated service method completely, or to ignore the event.

A post-event notification or "hook" is passed to the listener object after execution of the service method, or after the service method is skipped by the pre-event program logic. The listener object is allowed to execute more code, change the return value, or ignore the event.

In the present use case example, when a Web Conferences administrator user adds a new member to a Web Conference with a user role of "moderator", this results in an infrastructure layer service call to infrastructure-layer.addMember (memberName, memberRole). In response, the extensions infrastructure layer sends out notifications to all listener objects associated with the event consisting of the service method call, together with all context information necessary for operation of such listener objects. A listener object associated with the service method by the Web Conferences application component is invoked as a result. The listener object checks to determine if there is already a user with "Moderator" role, and, if so, prevents execution of the infrastructure service method. Otherwise, the infrastructure service method is permitted. After execution of the service method, post event processing by the listener object associated with the service method would include sending an email message to the user if he or she has been added as a moderator.

Those skilled in the art will recognize that the preceding use case example is given purely for purposes of explanation, and that the present invention is not limited to such operation.

FIGS. 1, 2 and 3 are block diagram and flowchart illustrations of methods, apparatus(s) and computer program products according to an embodiment of the invention. It will be understood that each block of FIGS. 1, 2 and 3, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier-wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A method and for providing a service oriented architecture, comprising:
   associating, responsive to a first higher level application component within a plurality of higher level application components, at least one listener object with an infrastructure service method;
   determining that said infrastructure service method has been requested by a second one of said plurality of higher level application components;
   invoking said at least one listener object prior to calling said infrastructure service method responsive to said determining that said infrastructure service method has been requested;
   determining whether said listener object has cancelled said infrastructure service method, and, responsive to a determination that said listener object has not cancelled execution of said infrastructure service method, calling said infrastructure service method;
   in the event that said listener object has not cancelled execution of said infrastructure service method, determining that said infrastructure service method has completed execution; and
   invoking said at least one listener object responsive to said determining that said infrastructure service method has completed execution.

2. The method of claim 1, further comprising:
   wherein said listener object is operable to modify at least one return variable of said infrastructure service method when said listener object is invoked responsive to said determining that said infrastructure service method has completed execution; and
   returning said modified return variable to said second one of said plurality of higher level application components.

3. The method of claim 1, wherein said first higher level application component and said second higher level application component are different ones of said plurality of higher level application components.

4. The method of claim 1, wherein said at least one listener object is operable to change at least one variable passed to said infrastructure service method when said listener object is invoked prior to calling said infrastructure service method.

5. The method of claim 1, wherein said listener object is operable to cancel execution of said infrastructure service method.

6. The method of claim 1, wherein said invoking said at least one listener object comprises invoking a plurality of listener objects associated with said infrastructure service method in a listener registry.

7. The method of claim 6, wherein said associating said at least one listener object with said infrastructure service method comprises said first one of said higher level application components entering an association between said at least one listener object with said infrastructure service method to said listener registry.

8. The method of claim 6, wherein said plurality of listener objects are associated with corresponding priorities, and wherein said invoking of said plurality of listener object further comprises invoking those of said plurality of listener objects having relatively higher corresponding priorities prior to invoking those of said plurality of listener objects having relatively lower corresponding priorities.

9. The method of claim 8, wherein each of said plurality of listener objects operates to provide a return value indicating whether any further of said plurality of listener objects are to be executed.

10. The method of claim 6, wherein said invoking of said plurality of listener objects comprises executing only one of said plurality of listener objects at a time.

11. The method of claim 6, wherein said invoking of said plurality of listener objects comprises executing multiple of said plurality of listener objects, at least in part, simultaneously.

12. The method of claim 1, wherein said higher level application components comprise application components providing at least a portion of a user interface through at least one client application component executing on a remote client computer system.

13. A system including a computer readable memory, said computer readable memory having program code stored thereon for providing a service oriented architecture, said program code comprising:
   program code for associating, responsive to a first higher level application component within a plurality of higher level application components, at least one listener object with an infrastructure service method;
   program code for determining that said infrastructure service method has been requested by a second one of said plurality of higher level application components;
   program code for invoking said at least one listener object prior to calling said infrastructure service method responsive to said determining that said infrastructure service method has been requested;
   program code for determining whether said listener object has cancelled said infrastructure service method, and, responsive to a determination that said listener object has not cancelled execution of said infrastructure service method, calling said infrastructure service method;
   program code for, in the event that said listener object has not cancelled execution of said infrastructure service method, determining that said infrastructure service method has completed execution; and
   program code for invoking said at least one listener object and responsive to said determining that said infrastructure service method has completed execution.

14. The system of claim 13, further comprising:
   wherein said listener object is operable to modify at least one return variable of said infrastructure service method when said listener object is invoked responsive to said determining that said infrastructure service method has completed execution; and
   program code for returning said modified return variable to said second one of said plurality of higher level application components.

15. The system of claim 13, wherein said first higher level application component and said second higher level application component are different ones of said plurality of higher level application components.

16. The system of claim 13, wherein said at least one listener object is operable to change at least one variable passed to said infrastructure service method when said listener object is invoked prior to calling said infrastructure service method.

17. The system of claim 13, wherein said listener object is operable to cancel execution of said infrastructure service method.

18. The system of claim 13, wherein said program code for invoking said at least one listener object comprises program code for invoking a plurality of listener objects associated with said infrastructure service method in a listener registry.

19. The system of claim 18, wherein said program code for associating said at least one listener object with said infrastructure service method comprises program code for said first one of said higher level application components to enter an association between said at least one listener object with said infrastructure service method to said listener registry.

20. The system of claim 18, wherein said plurality of listener objects are associated with corresponding priorities, and wherein said program code for invoking of said plurality of listener object further comprises program code for invoking those of said plurality of listener objects having relatively higher corresponding priorities prior to invoking those of said plurality of listener objects having relatively lower corresponding priorities.

21. The system of claim 20, wherein each of said plurality of listener objects comprises program code operable to provide a return value indicating whether any further of said plurality of listener objects are to be executed.

22. The system of claim 18, wherein said program code for invoking of said plurality of listener objects comprises program code for executing only one of said plurality of listener objects at a time.

23. The system of claim 18, wherein said program code for invoking of said plurality of listener objects comprises program code for executing multiple of said plurality of listener objects, at least in part, simultaneously.

24. The system of claim 13, wherein said higher level application components comprise application components operable to provide at least a portion of a user interface through at least one client application component executing on a remote client computer system.

25. A computer program product including a computer readable storage medium, said computer readable storage medium having program code stored thereon for providing a service oriented architecture, said program code comprising:

program code for associating, responsive to a first higher level application component within a plurality of higher level application components, at least one listener object with an infrastructure service method;

program code for determining that said infrastructure service method has been requested by a second one of said plurality of higher level application components;

program code for invoking said at least one listener object prior to calling said infrastructure service method responsive to said determining that said infrastructure service method has been requested;

program code for determining whether said listener object has cancelled said infrastructure service method, and, responsive to a determination that said listener object has not cancelled execution of said infrastructure service method, calling said infrastructure service method;

program code for, in the event that said listener object has not cancelled execution of said infrastructure service method, determining that said infrastructure service method has completed execution; and program code for invoking said at least one listener object and responsive to said determining that said infrastructure service method has completed execution.

26. A system for providing a service oriented architecture, comprising:

means for associating, responsive to a first higher level application component within a plurality of higher level application components, at least one listener object with an infrastructure service method;

means for determining that said infrastructure service method has been requested by a second one of said plurality of higher level application components;

means for invoking said at least one listener object prior to calling said infrastructure service method responsive to said determining that said infrastructure service method has been requested;

means for determining whether said listener object has cancelled said infrastructure service method, and, responsive to a determination that said listener object has not cancelled execution of said infrastructure service method, calling said infrastructure service method;

means for, in the event that said listener object has not cancelled execution of said infrastructure service method, determining that said infrastructure service method has completed execution; and means for invoking said at least one listener object and responsive to said determining that said infrastructure service method has completed execution.

* * * * *